United States Patent [19]

Schmidt et al.

[11] Patent Number: 5,630,769
[45] Date of Patent: May 20, 1997

[54] TENSION ROLLER FOR BELT DRIVES

[75] Inventors: Werner Schmidt, Herzogenaurach; Klaus Kampitsch, Munich, both of Germany

[73] Assignee: INA Walzlager Schaeffler KG, Germany

[21] Appl. No.: 571,897

[22] PCT Filed: Nov. 25, 1994

[86] PCT No.: PCT/EP94/03905

§ 371 Date: Dec. 16, 1995

§ 102(e) Date: Dec. 16, 1995

[87] PCT Pub. No.: WO95/16867

PCT Pub. Date: Jun. 22, 1995

[30] Foreign Application Priority Data

Dec. 17, 1993 [DE] Germany .................. 9319394 U

[51] Int. Cl.[6] .................................................. F16H 55/40
[52] U.S. Cl. ...................... 474/167; 474/197; 474/199; 474/902
[58] Field of Search .......................... 474/94, 133, 139, 474/152, 153, 167, 199, 272, 902, 197

[56] References Cited

U.S. PATENT DOCUMENTS

| 989,779 | 4/1911 | Harris | 474/902 |
|---|---|---|---|
| 3,350,950 | 11/1967 | Gandrud | 474/902 |
| 4,794,998 | 1/1989 | Iwai et al. | 474/902 X |

FOREIGN PATENT DOCUMENTS

| 0245789 | 11/1987 | European Pat. Off. . |
|---|---|---|
| 3625800 | 2/1988 | Germany . |

*Primary Examiner*—Roger J. Schoeppel
*Attorney, Agent, or Firm*—Bierman, Muserlian and Lucas LLP

[57] ABSTRACT

The invention concerns a tension roller made of a plastic material for adjusting a tension in a belt drive, comprising a wheel (7) having an inner ring (9) and an outer ring (10) connected to each other by axially oriented, circumferentially spaced ribs (12) and by a central web (8), the wheel (7) being rotatably mounted on a support element (2) which bears by a running face against the belt (3). According to the invention, successive ribs (12) enclose different angles with reference to a central point of the wheel.

6 Claims, 3 Drawing Sheets

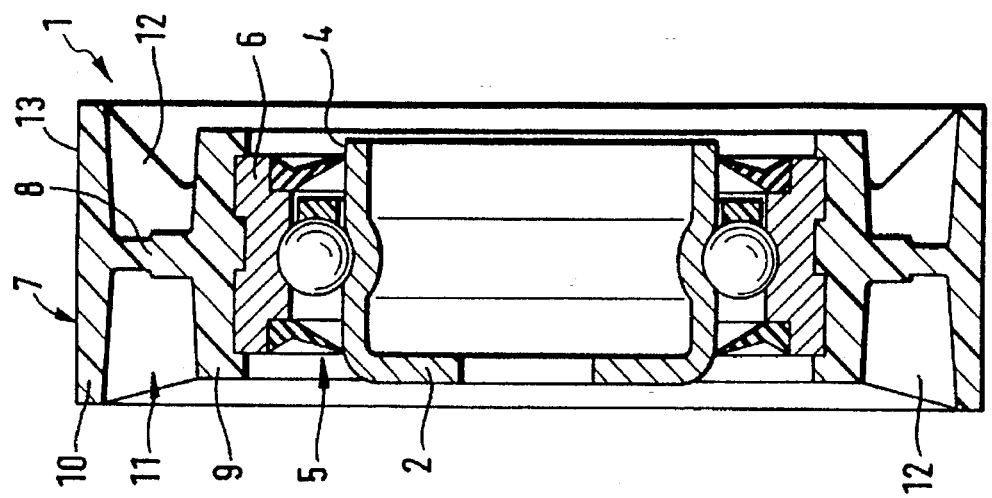
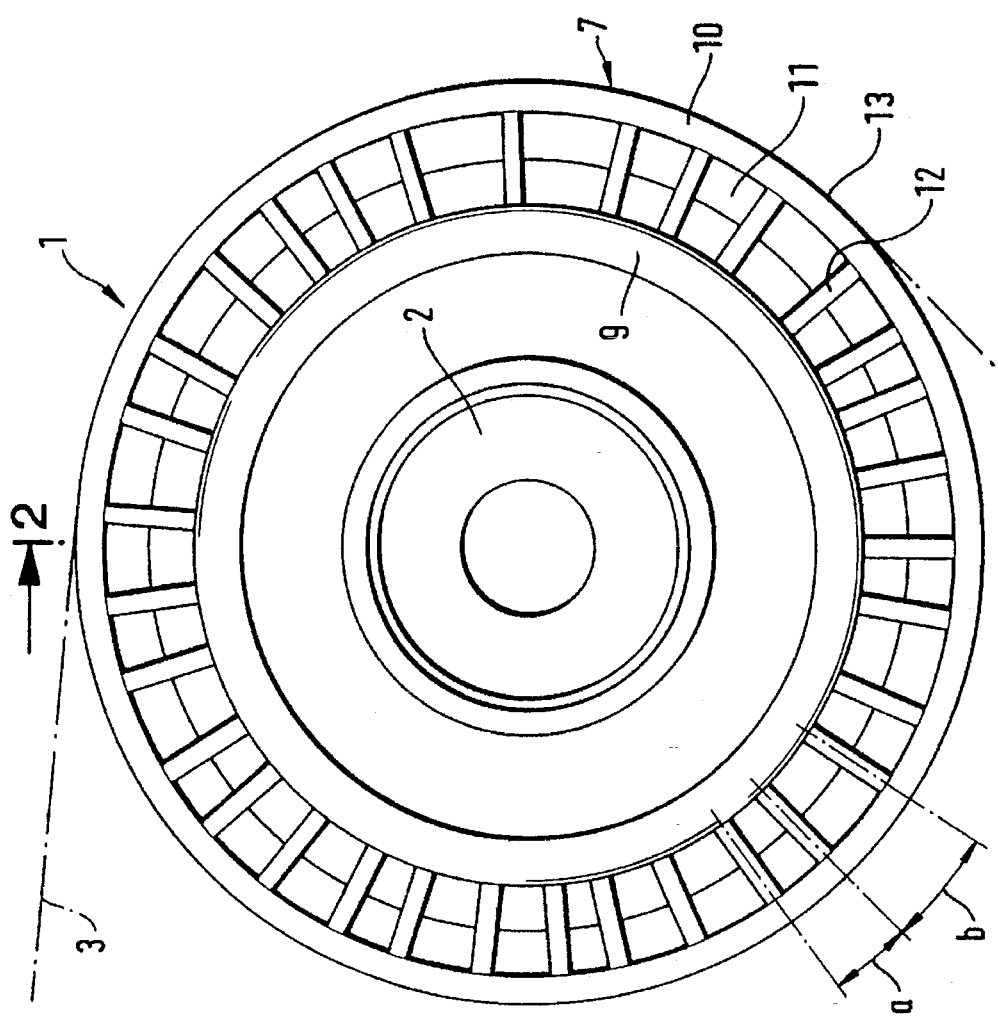

TENSION ROLLER FOR BELT DRIVES

The invention concerns a tension roller, particularly for belt drives of the type made of a plastic material, a castable material or a material spray-coated with a plastic material for adjusting a tension in a belt drive, comprising a wheel having an inner ring and an outer ring connected to each other by axially oriented, circumferentially spaced ribs and by a central web, the wheel being rotatably mounted on a support element which bears by a running face against a belt.

STATE OF THE ART

It is possible to adjust a desired belt tension in a belt drive with the help of a tension roller. From DE 32 26 419 A1, a tension roller is known in which a wheel made of a plastic material is mounted on a support element by means of a rolling bearing. The wheel includes an inner ring which is arranged rotationally fast on an outer ring of the rolling bearing and is connected by a central web and by axially extending, circumferentially uniformly spaced ribs to an outer ring. A connection with the belt drive is established via a running face of the outer ring.

At certain speeds of rotation, the uniform spacing of the ribs can lead to a resonance accompanied by detrimental noise stimulation which is particularly undesired in modern vehicles and detracts from comfort.

OBJECT OF THE INVENTION

It is an object of the invention to create a tension roller with reduced running noises.

THE INVENTION

The tension roller of the invention made of a plastic material, a castable material or a material spray-coated with a plastic material for adjusting a tension in a belt drive, comprising a wheel having an inner ring and an outer ring connected to each other by axially oriented, circumferentially spaced ribs and by a central web, the wheel being rotatably mounted on a support element which bears by a running face against a belt, is characterized in that successive ribs (12, 32, 52) enclose different angles therebetween with reference to a central point of the wheel (7, 27, 47).

The invention provides that the successive ribs of the wheel enclose different angles therebetween with reference to a central point of the wheel. Compared to the hitherto generally used uniform rib spacing, the non-uniform spacing of the ribs effectively eliminates resonance formation and contributes in particular to meeting the requirement of noise optimization in belt drives of automobile engines.

Conditional upon their manufacturing process, the plastic wheels of tension rollers have certain circularity errors, i.e. the portions of the running face between the ribs comprise almost straight sections instead of the desired curvature, so that the belt is periodically tightened in the region of the ribs and slackened in the intermediate portions. This causes a stimulation of vibration of the belt guided on the running face of the plastic wheel, and at certain speeds of rotation, the vibrations are intensified in the case of uniformly spaced ribs into a resonance accompanied by noise stimulation.

Due to the non-uniform spacing of the ribs as provided by the invention, different distances are advantageously obtained on the running face so that no uniform excitation of the belt is possible and the running noise of the tension roller is not detrimentally increased. The advantageous minimum distance between two adjacent ribs is 0.5 degrees or more.

In one embodiment of the invention, the ribs are arranged with periodically recurring angular dimensions. It is possible, for example, to choose a rib arrangement in which a particular angular distance occurs after every five ribs. If this measure is implemented, a balancing of the tension roller required for high speeds of rotation can advantageously be dispensed with or at least simplified.

To avoid excessively large differences in rib spacing, recites a maximum difference of <5 mm for all distances between ribs in the region of the running face is provided.

Another embodiment provides for the arrangement of intermediate ribs in alternation with standard ribs. Intermediate ribs are advantageously suited for tension rollers with large diameters because they enable large distances to be obtained at the ends of the ribs in the region of the running face despite a tight arrangement at the feet of the ribs. Thus the distances at the rib ends can be advantageously influenced by the use of intermediate ribs. The intermediate ribs permit the formation of an approximately fully circular running face with the distances between all ribs being different from one another.

The intermediate ribs may end in an intermediate ring which increases the strength of the wheel and is also connected to all other ribs.

A further measure contributing to a reduction of the running noise of the tension roller is to dispose covering disks laterally on the wheel. This also excludes a possibly disadvantageous open arrangement of the ribs which increases the running noise. To obtain a noise-optimized tension roller, it is advantageous to use the covering disks in addition to the non-uniform spacing of the ribs.

Further features of the invention will become evident from the drawings and their description:

FIG. 1 is a front view of a preferred embodiment of the tension roller of the invention;

FIG. 2 is a longitudinal section taken along line A—A of the tension roller of FIG. 1;

Figure 3:
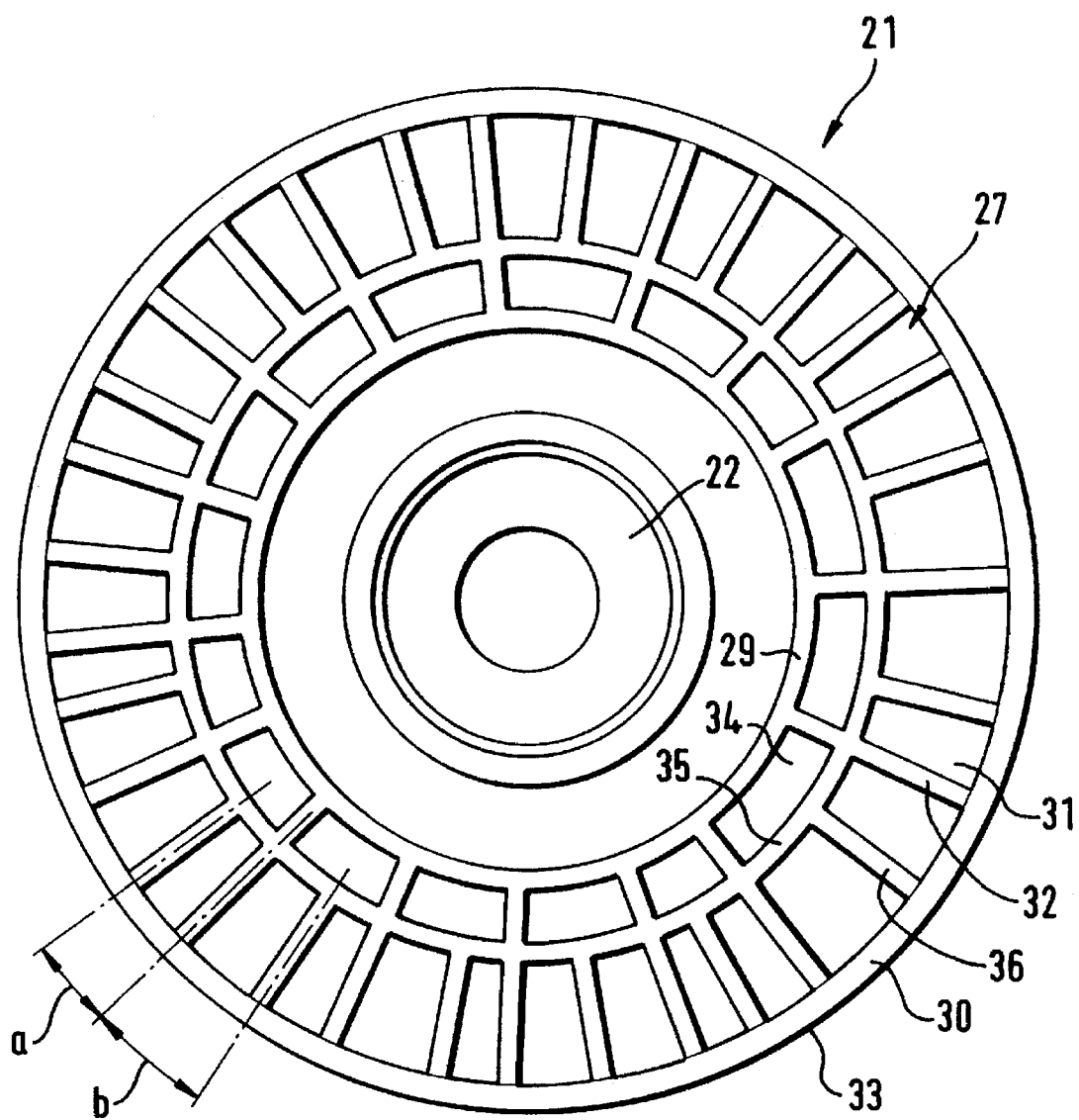
FIG. 3 is a front view of a tension roller of the invention comprising intermediate ribs.

The structure of a tension roller 1 according to the invention will at first be described with reference to FIGS. 1 and 2. The tension roller 1 comprises a support element 2 which is connected, for example, to a tensioner which serves to pre-tension a belt 3 of a belt drive. On the outer peripheral surface 4 of the pot-shaped support element 2 is guided a rolling bearing 5 on whose outer ring 6, a wheel 7 is positionally fixed. As an alternative to the rolling bearing shown here, it is also possible to use a series ball bearing with an inner ring guided on the support element 2 and an outer ring spray-coated, for example, with the material of the wheel 7. The wheel 7 made of a plastic material, or spray-coated with a plastic material, possesses an H-shaped cross-section with a central web 8 connecting an inner ring 9 and an outer ring 10 to each other. This configuration leads to the formation of U-shaped empty spaces 11 in which axially extending ribs 12 are arranged to provide stiffness. The belt 3 is guided on a running face 13 of the outer ring 10. As can be seen in FIG. 1, the ribs 12 are differently spaced from one another, see distances referenced at "a" and "b".

FIG. 3 shows a tension roller 21 whose support element 22 has smaller dimensions. The ribs 32 which extend from the inner ring 29 to the outer ring 30 therefore have a larger radial length. To obtain an adequate support of the running face 33 by the ribs, there are provided intermediate ribs 36 extending from the outer ring 30 to the intermediate ring 35. This configuration leads to the formation of differing empty spaces. The outer empty space 31 extends between the outer ring 30 and the intermediate ring 35 and is defined laterally by a rib 32 and an intermediate rib 36. The inner empty space 34 is formed in the region between the inner ring 29 and the intermediate ring 35 and is further delimited on each side by a rib 32.

Figure 4:
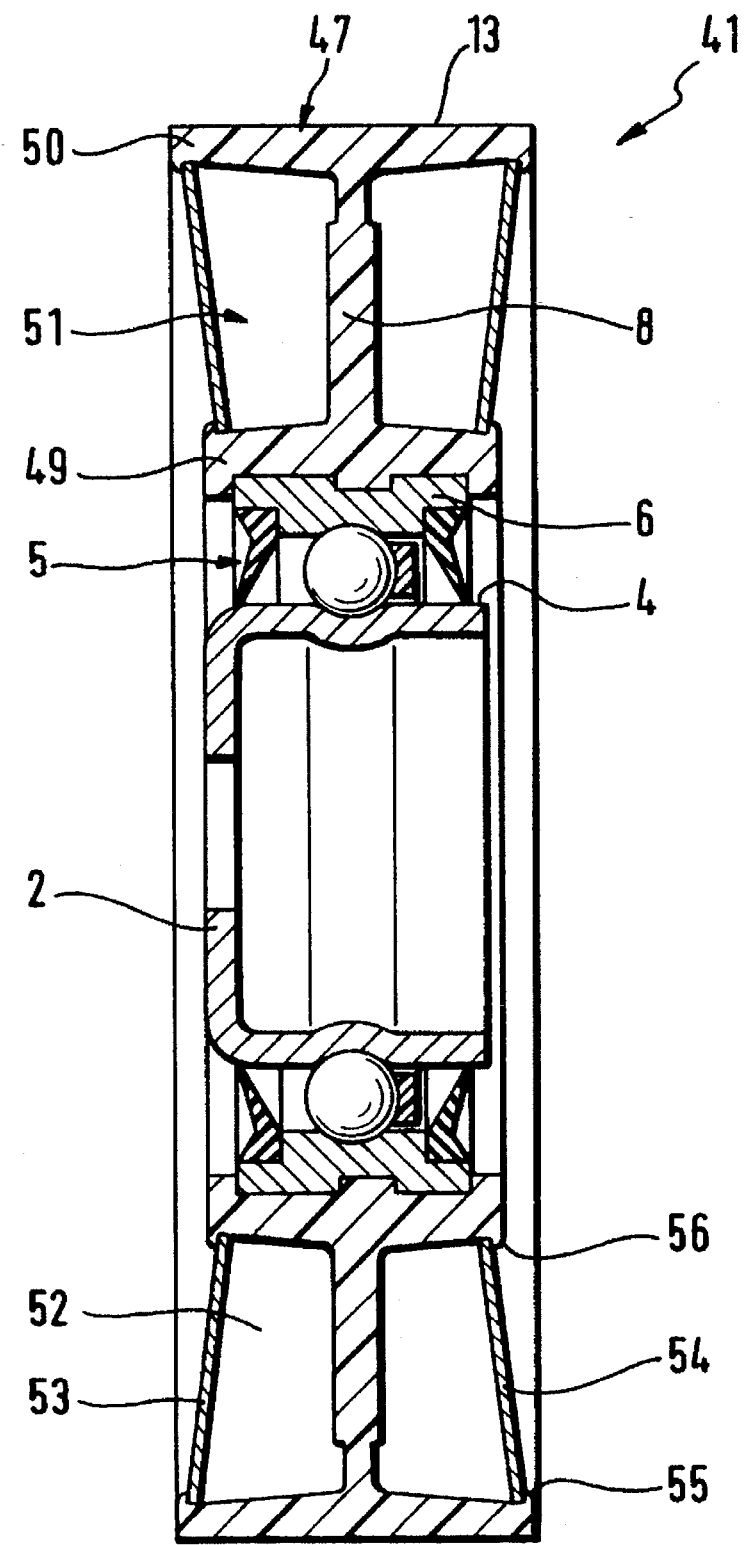
FIG. 4 is a longitudinal section through a tension roller comprising lateral covering disks.

In another embodiment of the tension roller of the invention shown in FIG. 4, parts identical with the first example of embodiment shown in FIG. 2 are designated by the same reference numerals so that reference can be made to the first example of embodiment for their description.

The tension roller 41 of FIG. 4 comprises additional means to help prevent detrimental noise stimulation by the ribs. This is obtained by closing the empty spaces 51 laterally with covering disks 53, 54, each of which connects the inner ring 49 to the outer ring 50 on the outside while bearing laterally against the ribs 52. The covering disks 53, 54 are fixed by rims 55, 56 arranged on the inner and the outer rings 49, 50 for locking with the covering disks 53, 54.

The wheel 47 thus has a closed, circular ring-shaped boxlike configuration which contributes to an effective reduction of noise.

List of Reference Numerals

| 1 | Tension roller |
| 2 | Support element |
| 3 | Belt |
| 4 | Peripheral surface |
| 5 | Rolling bearing |
| 6 | Outer ring |
| 7 | Wheel |
| 8 | Central web |
| 9 | Inner ring |
| 10 | Outer ring |
| 11 | Empty space |
| 12 | Rib |
| 13 | Running face |
| 21 | Tension roller |
| 22 | Support element |
| 27 | Wheel |
| 29 | Inner ring |
| 30 | Outer ring |
| 31 | Empty space (outer) |

-continued

List of Reference Numerals

| 32 | Rib |
| 33 | Running face |
| 34 | Empty space (inner) |
| 35 | Intermediate ring |
| 36 | Intermediate rib |
| 41 | Tension roller |
| 47 | Wheel |
| 49 | Inner ring |
| 50 | Outer ring |
| 51 | Empty space |
| 52 | Rib |
| 53 | Covering disk |
| 54 | Covering disk |
| 55 | Rim |
| 56 | Rim |

We claim:

1. A tension roller made of a plastic material, a castable material or a material spray-coated with a plastic material for adjusting a tension in a belt drive, comprising a wheel having an inner ring and an outer ring connected to each other by axially oriented, circumferentially spaced ribs and by a central web, the wheel being rotatably mounted on a support element which bears by a running face against a belt, characterized in that successive ribs (12, 32, 52) enclose different angles therebetween with reference to a central point of the wheel (7, 27, 47).

2. A tension roller of claim 1 wherein an arrangement of the ribs (12, 32, 52) comprises periodically recurring angular dimensions.

3. A tension roller of claim 1 wherein a difference of a distance dimension between the ribs (12, 32, 52) is less than 5 mm.

4. A tension roller of claim 1 wherein the ribs (32) are arranged in alternation with intermediate ribs (36).

5. A tension roller of claim 4 wherein the intermediate ribs (36) end in an intermediate ring (35).

6. A tension roller of claim 1 wherein on both sides of the wheel (47) are arranged covering disks (53, 54) which bear axially against the ribs (52) and connect the inner ring (49) to the outer ring (50).

* * * * *